(12) United States Patent
Yoshitake et al.

(10) Patent No.: US 11,979,021 B2
(45) Date of Patent: May 7, 2024

(54) ELECTRIC POWER SYSTEM AND POWER CONVERSION DEVICE CONNECTED TO A DC BUS

(71) Applicant: Panasonic Intellectual Property Management Co., Ltd., Osaka (JP)

(72) Inventors: Akira Yoshitake, Osaka (JP); Tomomi Kato, Aichi (JP); Takuya Karikawa, Osaka (JP); Yoshinori Noritake, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 345 days.

(21) Appl. No.: 17/428,552

(22) PCT Filed: Jan. 22, 2020

(86) PCT No.: PCT/JP2020/002015
§ 371 (c)(1),
(2) Date: Aug. 4, 2021

(87) PCT Pub. No.: WO2020/162166
PCT Pub. Date: Aug. 13, 2020

(65) Prior Publication Data
US 2022/0200435 A1 Jun. 23, 2022

(30) Foreign Application Priority Data
Feb. 6, 2019 (JP) .................................. 2019-019857

(51) Int. Cl.
*H02J 3/32* (2006.01)
*H02J 1/10* (2006.01)
(Continued)

(52) U.S. Cl.
CPC ............... *H02J 1/102* (2013.01); *H02S 40/32* (2014.12); *H02J 3/28* (2013.01); *H02J 3/32* (2013.01)

(58) Field of Classification Search
CPC ..................................... H02J 3/28; H02J 3/32
See application file for complete search history.

(56) References Cited

U.S. PATENT DOCUMENTS

| | | |
|---|---|---|
| 9,800,051 B2 | 10/2017 | Laubenstein et al. |
| 11,025,056 B2 | 6/2021 | Kikuchi et al. |

(Continued)

FOREIGN PATENT DOCUMENTS

| | | |
|---|---|---|
| CN | 108418200 A | 8/2018 |
| CN | 106505552 B | 1/2019 |

(Continued)

OTHER PUBLICATIONS

Extended European Search Report issued for corresponding European Patent Application No. 20752003.2, dated Jun. 9, 2022.

(Continued)

*Primary Examiner* — Sisay G Tiku
(74) *Attorney, Agent, or Firm* — Rimon P.C.

(57) ABSTRACT

A power converter for a power system performs power control of a power system by using a first control value derived based on a first stabilization command value for causing a voltage on a first DC bus to be within a first range and a first control command value different from the first stabilization command value. A power converter for a solar cell performs power control of a solar cell by using a second control value derived based on a second stabilization command value for causing a voltage on a second DC bus to be within a second range and a second control command value different from the second stabilization command value. The first range is narrower than the second range.

10 Claims, 9 Drawing Sheets

(51) Int. Cl.
  *H02J 3/28* (2006.01)
  *H02S 40/32* (2014.01)

(56) References Cited

U.S. PATENT DOCUMENTS

| | | | |
|---|---|---|---|
| 2012/0188806 A1* | 7/2012 | Tamura | H02J 3/44 363/95 |
| 2014/0285010 A1 | 9/2014 | Cameron | |
| 2015/0263641 A1* | 9/2015 | Noritake | H02M 7/06 363/126 |
| 2017/0317503 A1* | 11/2017 | Ohashi | H02S 40/32 |
| 2018/0329382 A1* | 11/2018 | Somani | H02J 3/46 |
| 2019/0326752 A1 | 10/2019 | Kikuchi et al. | |

FOREIGN PATENT DOCUMENTS

| | | | | |
|---|---|---|---|---|
| JP | 2003339118 A | * | 11/2003 | |
| JP | 2014-128047 A | | 7/2014 | |
| JP | 2017-046532 A | | 3/2017 | |
| JP | 2017085892 A | * | 5/2017 | |
| JP | 2017-175888 A | | 9/2017 | |
| JP | 2018061359 A | * | 4/2018 | |
| JP | 7181691 B2 | * | 12/2022 | |
| WO | WO-2017163960 A1 | * | 9/2017 | H02J 1/00 |
| WO | 2018/142987 A1 | | 8/2018 | |
| WO | WO-2018142987 A1 | * | 8/2018 | H02J 1/102 |
| WO | WO-2019142534 A1 | * | 7/2019 | |
| WO | WO-2020162166 A1 | * | 8/2020 | G05F 1/67 |
| WO | WO-2022107583 A1 | * | 5/2022 | |

OTHER PUBLICATIONS

International Search Report issued in corresponding International Patent Application No. PCT/JP2020/002015, dated Mar. 3, 2020, with English translation.

* cited by examiner

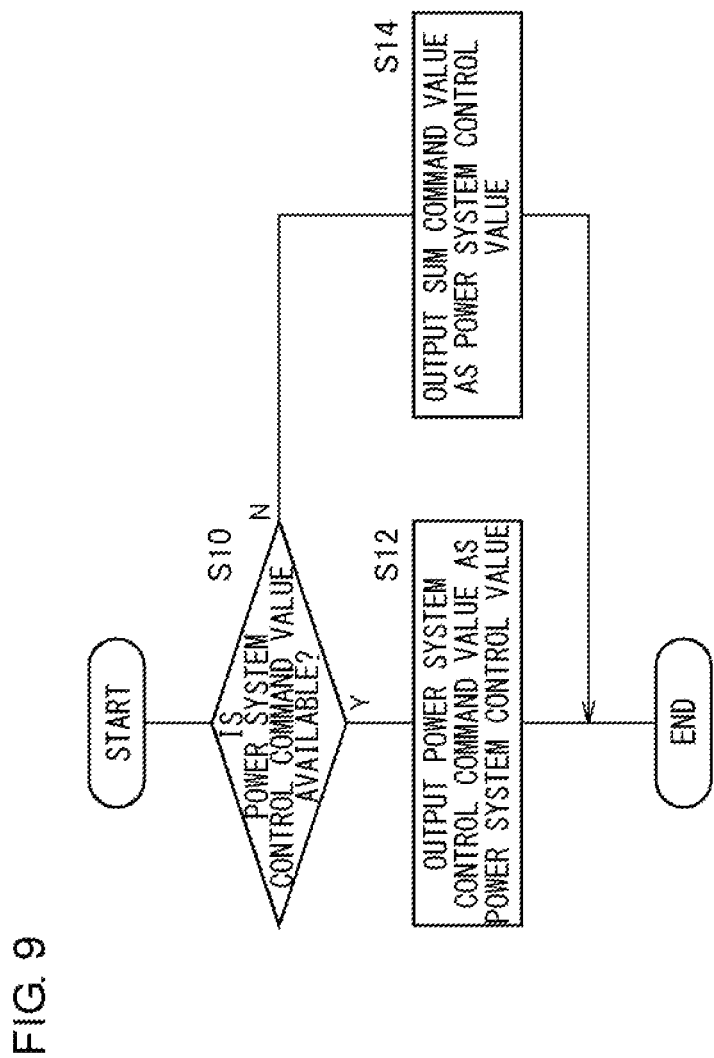

ELECTRIC POWER SYSTEM AND POWER CONVERSION DEVICE CONNECTED TO A DC BUS

CROSS-REFERENCE OF RELATED APPLICATIONS

This application is the U.S. National Phase under 35 U.S.C. § 371 of International Patent Application No. PCT/JP2020/002015, filed on Jan. 22, 2020, which in turn claims the benefit of Japanese Patent Application No. 2019-019857, filed on Feb. 6, 2019, the entire disclosures of which Applications are incorporated by reference herein.

TECHNICAL FIELD

The present disclosure relates to power systems and power converters in which the equipment is connected to a DC bus.

BACKGROUND ART

In a system in which a generator that utilizes natural energy such as force of wind and a storage battery are connected, excess power may be generated when the storage battery is charged with power generated by the generator. When the voltage on the DC bus of the system rises due to the excess power, unstable operation of the system may occur. Therefore, the control scheme is switched in the generator and the storage battery in accordance with the voltage on the DC bus (see, for example, Patent Literature 1).

[Patent Literature 1] JP2017-46532

SUMMARY OF INVENTION

Technical Problem

A power converter is connected to each of the generator, the storage battery, and the power system, and the plurality of power converters are connected to the DC bus. To simplify the configuration of such a system, the plurality of power converters apply independent power control to the generator, etc. connected. When the plurality of power converters apply power control in accordance with the voltage on the DC bus to stabilize the system in this case, the efficiency of power control drops. Meanwhile, the generator, the storage battery, and the power system connected to the respective power converters have different roles. It is desired to inhibit the efficiency of power control from dropping by considering these roles of the equipment.

The present disclosure addresses the issue and a purpose thereof is to provide a technology of inhibiting the efficiency of power control from dropping, while at the same time stabilizing the system.

Solution to Problem

A power system according to an embodiment of the present disclosure includes: a first power converter that is connected to a first target of control capable of performing at least one of generation, storage, and distribution of power and also connected to a DC bus; and a second power converter that is connected to a second target of control capable of performing at least one of generation, storage, and distribution of power and also connected to the DC bus. The first power converter performs power control of the first target of control by using a first control value derived based on a first stabilization command value for causing a voltage on the DC bus to be within a first range and a first control command value different from the first stabilization command value, the second power converter performs power control of the second target of control by using a second control value derived based on a second stabilization command value for causing the voltage on the DC bus to be within a second range and a second control command value different from the second stabilization command value, and the first range is narrower than the second range.

Another embodiment of the present disclosure relates to a power system. The power system includes: a first power converter that is connected to a first target of control capable of performing at least one of generation, storage, and distribution of power and also connected to a DC bus; and a second power converter that is connected to a second target of control capable of performing at least one of generation, storage, and distribution of power and also connected to the DC bus. The first power converter performs power control of the first target of control by using a first control value derived based on a first stabilization command value for causing a voltage on the DC bus to be within a first range and a first control command value different from the first stabilization command value, the second power converter performs power control of the second target of control by using a second control value derived based on a second stabilization command value for causing the voltage on the DC bus to be within a second range and a second control command value different from the second stabilization command value, and a lower limit of the first range and the second range is larger than zero volt.

Still another embodiment of the present disclosure relates to a power converter. The power converter is connected to a target of control capable of performing at least one of generation, storage, and distribution of power and also connected to a DC bus, the power converter including: a stabilization command value derivation unit that derives a stabilization command value for causing a voltage on the DC bus to be within a preset range; a control command value derivation unit that derives a control command value different from the stabilization command value; a control value derivation unit that derives a control value based on the stabilization command value and the control command value; and an instruction unit that performs power control of the target of control by using the control value.

Optional combinations of the aforementioned constituting elements, and implementations of the present disclosure in the form of methods, apparatuses, systems, computer programs, recording mediums recording computer programs, etc. may also be practiced as additional modes of the present disclosure.

Advantageous Effect of Invention

According to the disclosure, it is possible to inhibit the efficiency of power control from dropping, while at the same time stabilizing the system.

BRIEF DESCRIPTION OF DRAWINGS

FIG. 9 is a flowchart showing steps of output from the power converter for a power system according to embodiment 2.

DESCRIPTION OF EMBODIMENTS

Embodiment 1

Figure 1:
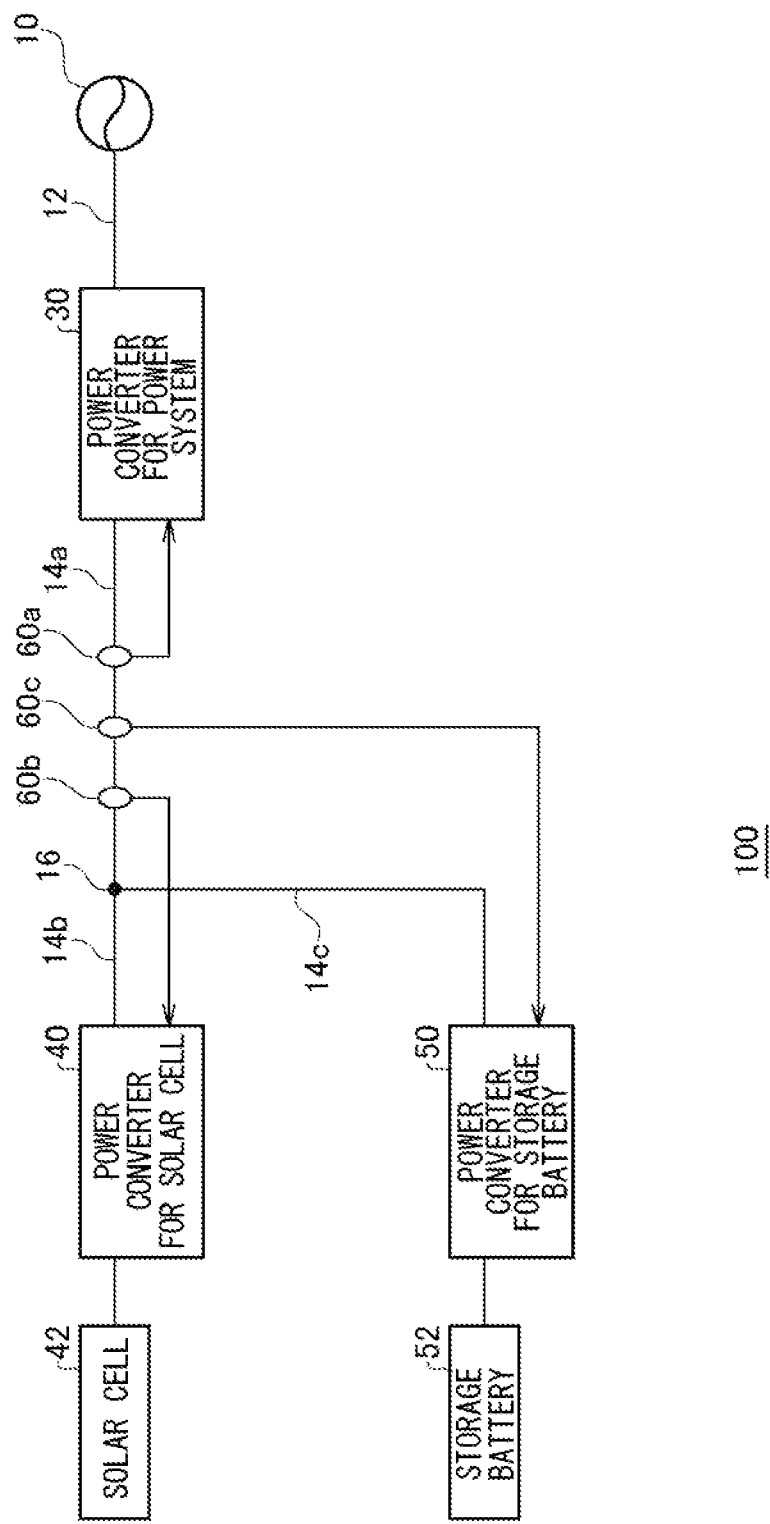
FIG. 1 shows a configuration of a power system according to embodiment 1.

A brief summary will be given before describing the present disclosure in specific details. The embodiment relates to a power system in which a power converter is connected to each of the generator, the storage battery, and the power system at a customer's site, and the plurality of power converters are connected to a DC bus. The customer's site is a facility that receives a supply of power from an electric utility company, etc. and is exemplified by a residence, an office, a shop, a factory, a park, etc. A power distribution line extending from the power system is connected to the power converter at the customer's site. As described above, the power converters perform power control independently to simplify the configuration of the power system. If a plurality of power converters output DC power to the DC bus all at once according to independent power control, the volage on the DC bus will be increased, and the power system will become unstable. In the case a plurality of power converters perform power control in accordance with the voltage on the DC bus to stabilize the power system, the power will be controlled to allow for the voltage on the DC bus so that the efficiency of power control drops.

Meanwhile, the generator, the storage battery, and the power system connected to the respective power converters have different roles. For example, the generator such as a solar cell has a role of supplying a large DC power to the DC bus, and the power system has a role of stabilizing the power system. It is therefore desired to inhibit the efficiency of power control from dropping while, at the same time, stabilizing the power system, by allowing for these roles of the equipment.

Therefore, each power converter perform power conversion based on a control value adapted for control for stabilizing the voltage on the DC bus and for control inherent in the equipment. Control for stabilizing the voltage on the DC bus is performed to return, when the voltage on the DC is not within a predefined range, the voltage on the DC bus to be within the range. That the voltage on the DC bus is not within a predefined range means that the voltage on the DC bus becomes larger than the maximum value of the range or smaller than the minimum value of the range. Meanwhile, control inherent in the equipment is maximum power point tracking (MPPT) control in the case the equipment is a solar cell. It is desired to perform control for stabilizing the voltage on the DC bus in order to stabilize the power system, but it is desired to perform control inherent in the equipment in order to inhibit the efficiency of power control from dropping.

The ranges set in the respective power converters are made to differ in consideration of the role of the equipment connected to the power converter. For example, the range is narrowed in the power converter connected to the power system. This makes it easy for the power converter to perform control for stabilizing the voltage on the DC bus. Meanwhile, a wider range is provided in the power converter connected to the generator such as a solar cell. This makes it difficult for the power converter to perform control for stabilizing the voltage on the DC bus. By making the ranges set in the respective power converters to differ, the system is stabilized, and the efficiency of power control is inhibited from dropping.

FIG. 1 shows a configuration of a power system 100. The power system 100 includes a power system 10, a power distribution line 12, a first DC bus 14a, a second DC bus 14b, a third DC bus 14c, which are generically referred to as a DC bus 14, a branch node 16, a power converter 30 for a power system, a power converter 40 for a solar cell, a solar cell 42, a power converter 50 for a storage battery, a storage battery 52, a first measurement apparatus 60a, a second measurement apparatus 60b, and a third measurement apparatus 60c, which are generically referred to as a measurement apparatus 60. The power system 100 is installed in a customer's site. The power converter 30 for a power system and the power converter 40 for a solar cell may be configured as one apparatus, or the power converter 30 for a power system and the power converter 50 for a storage battery may be configured as one apparatus. The former corresponds to a power conditioner for photovoltaic power generation, and the latter corresponds to a power conditioner for a storage battery.

The power system 10 is a commercial power source of an electric utility company and is exemplified by single-phase three-wire system 200V/100V commercial power. The power distribution line 12 extends from the power system 10 to the customer's site. A publicly known technology may be used for the power distribution line 12, and a description thereof is omitted. The power converter 30 for a power system is connected to the power distribution line 12, the first DC bus 14a extends from the power converter 30 for a power system, and the first DC bus 14a branches into the second DC bus 14b and the third DC bus 14c at the branch node 16. The power converter 40 for a solar cell and the solar cell 42 are connected to the second DC bus 14b, and the power converter 50 for a storage battery and the storage battery 52 are connected to the third DC bus 14c. In this way, the power converter 30 for a power system, the power converter 40 for a solar cell, and the power converter 50 for a storage battery are connected to the DC bus 14.

The power converter 30 for a power system converts the AC power from the power distribution line 12 into DC power and outputs the DC power to the DC bus 14. Further, the power converter 30 for a power system converts the DC power from the DC bus 14 into AC power and outputs the AC power to the power distribution line 12. In this way, the power converter 30 for a power system performs conversion between AC power and DC power.

The solar cell 42 is a renewable energy generator. The solar cell 42 uses photovoltaic effect and converts light energy into electric power directly. A silicon solar cell, a solar cell made of a compound semiconductor, etc., a dye-sensitized solar cell (organic solar cell) or the like is used as the solar cell. The solar cell 42 is connected to the power converter 40 for a solar cell and outputs the generated DC power to the power converter 40 for a solar cell. The power converter 40 for a solar cell converts the DC power output from the solar cell 42 into DC power of a desired volage value and outputs the DC power from the conversion to the DC bus 14.

The storage battery 52 is capable for collecting and discharging power and is comprised of a plurality of storage battery cells in series connection or in series-parallel connection. A lithium ion storage battery, a nickel hydride storage battery, a lead storage battery, an electric double layer capacitor, a lithium ion capacitor, or the like is used as the storage battery cell. An electric double layer condenser may be used as the storage battery 52. The power converter 50 for a storage battery controls charge and discharge in the storage battery 52. The power converter 50 for a storage battery converts the DC power from the DC bus 14 into DC power of a desired voltage value and outputs the DC power from the conversion to the storage battery 52, when the storage battery 52 is charged. Meanwhile, the power converter 50 for a storage battery converts the DC power from the storage battery 52 into DC power of a desired voltage value and outputs the DC power from the conversion to the DC bus 14, when the storage battery 52 is discharged.

The first measurement apparatus 60*a* through the third measurement apparatus 60*c* are provided on the DC bus 14. These measurement apparatuses 60 are voltmeters for measuring the voltage value of the DC bus 14. The first measurement apparatus 60*a* outputs the measured voltage value to the power converter 30 for a power system, the second measurement apparatus 60*b* outputs the measured voltage value to the power converter 40 for a solar cell, and the third measurement apparatus 60*c* outputs the measured voltage value to the power converter 50 for a storage battery.

It can be said that the power system 10, the solar cell 42, and the storage battery 52 are targets of control capable of performing at least one of generation, storage, and distribution of power. When the power system 10 is referred to as the first target of control, the storage battery 52 will be referred to as the second target of control, and the solar cell 42 will be referred to as the third target of control. The storage battery 52 may be referred to as the third target of control, and the solar cell 42 may be referred to as the second target of control. When the power system 10 is excluded and the storage battery 52 is referred to as the first target of control, the solar cell 42 will be referred to as the second target of control. Further, the power converter 30 for a power system, the power converter 40 for a solar cell, and the power converter 50 for a storage battery will be generically referred to as the power converter. When the power converter connected to the first target of control is referred to as the first power converter, the power converter connected to the second target of control is referred to as the second power converter, and the power converter connected to the third target of control will be referred to as the third power converter.

Figure 2:
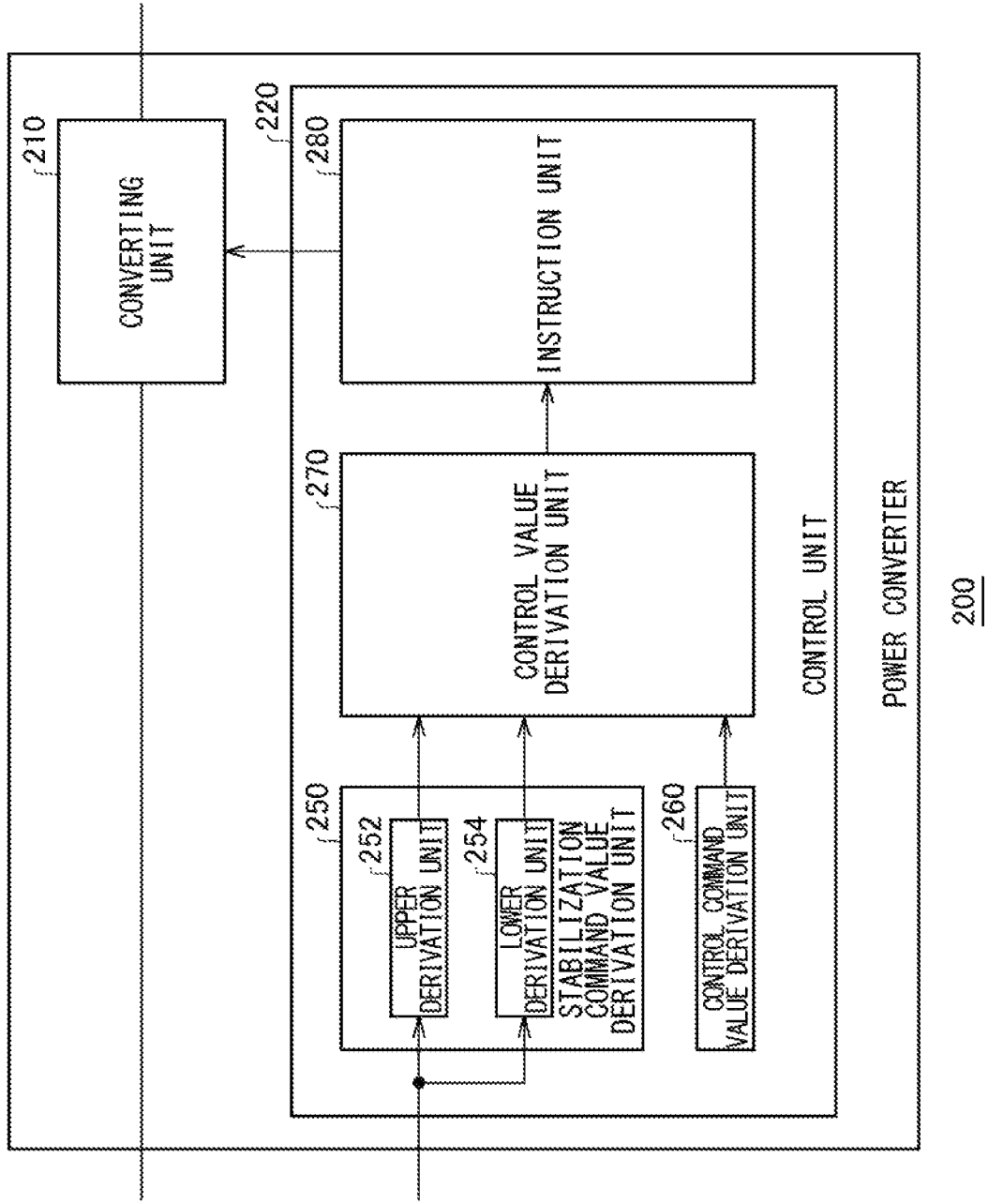
FIG. 2 shows a configuration of a power converter according to embodiment 1.

FIG. 2 shows a configuration of a power converter 200. The power converter 200 includes a converting unit 210 and a control unit 220. The control unit 220 includes a stabilization command value derivation unit 250, a control command value derivation unit 260, a control value derivation unit 270, an instruction unit 280. The stabilization command value derivation unit 250 includes an upper derivation unit 252 and a lower derivation unit 254. The power converter 200 is a generic term for the power converter 30 for a power system, the power converter 40 for a solar cell, and the power converter 50 for a storage battery. The description below is given in the order of (1) the case in which the power converter 200 is the power converter 30 for a power system, (2) the case in which the power converter 200 is the power converter 40 for a solar cell, and (3) the case in which the power converter 200 is the power converter 50 for a storage battery.

(1) In the case the power converter 200 is the power converter 30 for a power system The converting unit 210 is a bidirectional inverter. In the forward flow state, the converting unit 210 converts the AC power from the power distribution line 12 into DC power and outputs the DC power to the DC bus 14. In the reverse flow state, the converting unit 210 converts the DC power from the DC bus 14 into AC power and outputs the AC power to the power distribution line 12. The converting unit 210 is controlled by the control unit 220.

The stabilization command value derivation unit 250 receives the voltage value from the first measurement apparatus 60*a*, i.e., the voltage value of the DC bus 14. When the voltage value is not within a predefined range (hereinafter, "power system range"), the stabilization command value derivation unit 250 generates a power system stabilization command value for causing the voltage value to be within in the power system range. To describe it more specifically, the upper derivation unit 252 sets an upper threshold value of the power system range (hereinafter, "power system upper threshold value"). When the voltage value is equal to or larger than the power system upper threshold value, the upper derivation unit 252 generates a power system upper stabilization command value for decreasing the voltage value. The upper derivation unit 252 outputs the power system upper stabilization command value to the control value derivation unit 270. The lower derivation unit 254 sets a lower threshold value of the power system range (hereinafter, "power system lower threshold value"). When the voltage value is equal to or smaller than the power system lower threshold value, the lower derivation unit 254 generates a power system lower stabilization command value for increasing the voltage value. The lower derivation unit 254 outputs the power system lower stabilization command value to the control value derivation unit 270.

The control command value derivation unit 260 performs control to cause the power system 10 to exhibit the inherent function. The control is performed in response to a request from the electric utility company, a request from the virtual power plant (VPP), or a request from the home energy management system (HEMS) equipment. A publicly known technology may be used for this control, and a description thereof is omitted. The control command value derivation unit 260 generates a power system control command value suited to the control and outputs the power system control command value to the control value derivation unit 270.

The control value derivation unit 270 receives the power system upper stabilization command value from the upper derivation unit 252, the power system lower stabilization command value from the lower derivation unit 254, and the power system control command value from the control command value derivation unit 260. Unless at least one of these command values is generated, the control value derivation unit 270 does not receive the command value. The control value derivation unit 270 generates a power system control value based on the power system upper stabilization command value, the power system lower stabilization command value, and the power system control command value. For example, the control value derivation unit 270 generates a power system control value by calculating a sum of the power system upper stabilization command value, the power system lower stabilization command value, and the power system control command value. The control value derivation unit 270 outputs the power system control value to the instruction unit 280. The instruction unit 280 receives the power system control value from the control value derivation unit 270. The instruction unit 280 controls the converting unit 210 by outputting the power system control value to the converting unit 210. This is equivalent to performing power control of the power system 10.

(2) In the case the power converter 200 is the power converter 40 for a solar cell The converting unit 210 is a DC-DC converter. The converting unit 210 converts the DC power from the solar cell 42 into DC power of a desired voltage value and outputs the DC power from the conversion to the DC bus 14. The converting unit 210 is controlled by the control unit 220.

The stabilization command value derivation unit 250 receives the voltage value from the second measurement apparatus 60b, i.e., the voltage value of the DC bus 14. When the voltage value is not within a predefined range (hereinafter, "solar cell range"), the stabilization command value derivation unit 250 generates a solar cell stabilization command value for causing the voltage value to be within the solar cell range. To describe it more specifically, the upper derivation unit 252 sets an upper threshold value of the solar cell range (hereinafter, "solar cell upper threshold value"). When the voltage value is equal to or larger than the solar cell upper threshold value, the upper derivation unit 252 generates a solar cell upper stabilization command value for decreasing the voltage value. The upper derivation unit 252 outputs the solar cell upper stabilization command value to the control value derivation unit 270. The lower derivation unit 254 sets a lower threshold value of the solar cell range (hereinafter, "solar cell lower threshold value"). When the voltage value is equal to or smaller than the solar cell lower threshold value, the lower derivation unit 254 generates a solar cell lower stabilization command value for increasing the voltage value. The lower derivation unit 254 outputs the solar cell lower stabilization command value to the control value derivation unit 270.

The control command value derivation unit 260 performs control to cause the solar cell 42 to exhibit the inherent function. The control in this case is MPPT control. The control command value derivation unit 260 generates a solar cell control command value suited to the control and outputs the solar cell control command value to the control value derivation unit 270.

The control value derivation unit 270 receives the solar cell upper stabilization command value from the upper derivation unit 252, the solar cell lower stabilization command value from the lower derivation unit 254, and the solar cell control command value from the control command value derivation unit 260. Unless at least one of these command values is generated, the control value derivation unit 270 does not receive the command value. The control value derivation unit 270 generates a solar cell control value based on the solar cell upper stabilization command value, the solar cell lower stabilization command value, and the solar cell control command value. For example, the control value derivation unit 270 generates a solar cell control value by calculating a sum of the solar cell upper stabilization command value, the solar cell lower stabilization command value, and the solar cell control command value. The control value derivation unit 270 outputs the solar cell control value to the instruction unit 280. The instruction unit 280 receives the solar cell control value from the control value derivation unit 270. The instruction unit 280 controls the converting unit 210 by outputting the solar cell control value to the converting unit 210. This is equivalent to performing power control of the solar cell 42.

(3) In the case the power converter 200 is the power converter 50 for a storage battery The converting unit 210 is a bidirectional DC-DC converter. The converting unit 210 converts the DC power from the storage battery 52 into DC power of a desired voltage value and outputs the DC power from the conversion to the DC bus 14, when the storage battery 52 is discharged. Further, the converting unit 210 converts the DC power from the DC bus 14 into DC power of a desired voltage value and outputs the DC power from the conversion to the storage battery 52, when the storage battery 52 is charged. The converting unit 210 is controlled by the control unit 220.

The stabilization command value derivation unit 250 receives the voltage value from the third measurement apparatus 60c, i.e., the voltage value of the DC bus 14. When the voltage value is not within a predefined range (hereinafter, "storage battery range"), the stabilization command value derivation unit 250 generates a storage battery stabilization command value for causing the voltage value to be within the storage battery range. To describe it more specifically, the upper derivation unit 252 sets an upper threshold value of the storage battery range (hereinafter, "storage battery upper threshold value"). When the voltage value is equal to or larger than the storage battery upper threshold value, the upper derivation unit 252 generates a storage battery upper stabilization command value for decreasing the voltage value. The upper derivation unit 252 outputs the storage battery upper stabilization command value to the control value derivation unit 270. The lower derivation unit 254 sets a lower threshold value of the storage battery range (hereinafter, "storage battery lower threshold value"). When the voltage value is equal to or smaller than the storage battery lower threshold value, the lower derivation unit 254 generates a storage battery lower stabilization command value for increasing the voltage value. The lower derivation unit 254 outputs the storage battery lower stabilization command value to the control value derivation unit 270.

The control command value derivation unit 260 performs control to cause the storage battery 52 to exhibit the inherent function. This control is performed in accordance with, for example, a charge request or a discharge request. A publicly known technology may be used for this control, and a description thereof is omitted. The control command value derivation unit 260 generates a storage battery control command value suited to the control and outputs the storage battery control command value to the control value derivation unit 270.

The control value derivation unit 270 receives the storage battery upper stabilization command value from the upper derivation unit 252, the storage battery lower stabilization command value from the lower derivation unit 254, and the storage battery control command value from the control command value derivation unit 260. Unless at least one of these command values is generated, the control value derivation unit 270 does not receive the command value. The control value derivation unit 270 generates a storage battery control value based on the storage battery upper stabilization command value, the storage battery lower stabilization command value, and the storage battery control command value. For example, the control value derivation unit 270 generates a storage battery control value by calculating a sum of the storage battery upper stabilization command value, the storage battery lower stabilization command value, and the storage battery control command value. The control value derivation unit 270 outputs the storage battery control value to the instruction unit 280. The instruction unit 280 receives the storage battery control value from the control value derivation unit 270. The instruction unit 280 controls the converting unit 210 by outputting the storage battery control value to the converting unit 210. This is equivalent to performing power control of the storage battery 52.

When the range, the upper threshold value, and the lower threshold value in the first power converter are referred to as "first range", "first upper threshold value", and "first lower threshold value", the range, the upper threshold value, and the lower threshold value in the second power converter will be referred to as "second range", "second upper threshold value", and "second lower threshold value". Further, the range, the upper threshold value, and the lower threshold value in the third power converter will be referred to as "third range", "third upper threshold value", and "third lower threshold value".

The upper stabilization command value, the lower stabilization command value, the control command value, and the control value in the first power converter may be referred to as "first upper stabilization command value", "first lower stabilization command value", "first control command value", and "first control value". The upper stabilization command value, the lower stabilization command value, the control command value, and the control value in the second power converter may be referred to as "second upper stabilization command value", "second lower stabilization command value", "second control command value", and "second control value". The upper stabilization command value, the lower stabilization command value, the control command value, and the control value in the third power converter may be referred to as "third upper stabilization command value", "third lower stabilization command value", "third control command value", and "third control value".

A description will be given below of the relationship between the upper threshold values and the lower threshold values set in the power converter 30 for a power system, the power converter 40 for a solar cell, and the power converter 50 for a storage battery. This is equivalent to the relationship between the power system upper threshold value, the power system lower threshold value, the solar cell upper threshold value, the solar cell lower threshold value, the storage battery upper threshold value, and the storage battery lower threshold value.

Figure 3:
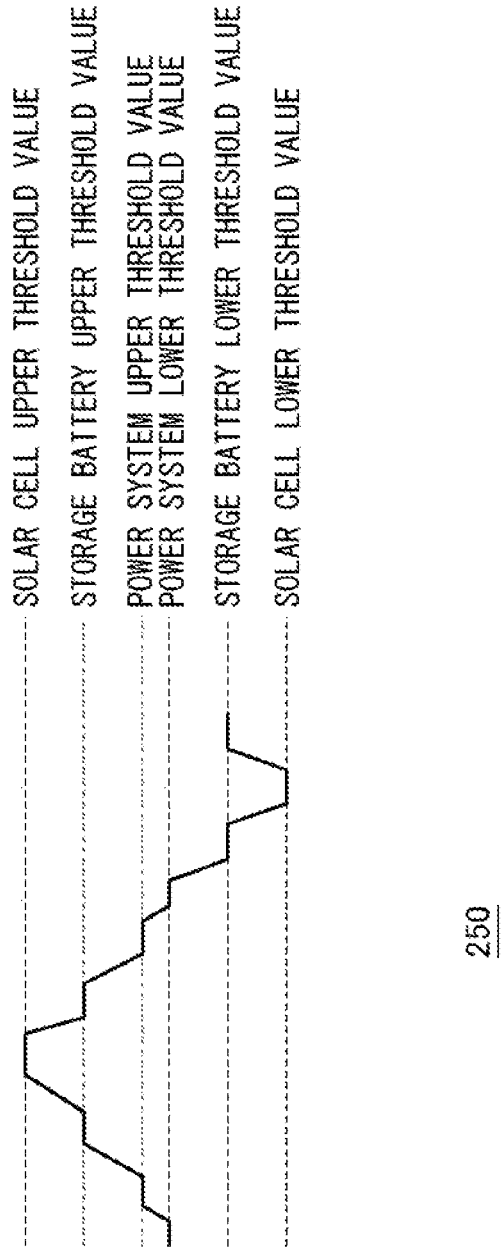
FIG. 3 shows threshold values stored in the stabilization command value derivation unit of FIG. 2.

FIG. 3 shows threshold values stored in the stabilization command value derivation unit 250. The power system upper threshold value and the power system lower threshold value are provided so as to sandwich the target voltage value. The storage battery upper threshold value larger than the power system upper threshold value is provided, and the solar cell upper threshold value larger than the storage battery upper threshold value is provided. The storage battery lower threshold value smaller than the power system lower threshold value is provided, and the solar cell lower threshold value smaller than the storage battery lower threshold value is provided. When the targeted voltage value (hereinafter, "target value") is "350 V", for example, the power system upper threshold value is set to "355 V", and the power system lower threshold value is set to "345 V". Further, the solar cell upper threshold value is set to "370 V", the solar cell lower threshold value is set to "330 V", the storage battery upper threshold value is set to "360 V", and the storage battery lower threshold value is set to "340 V".

The gap between the power system upper threshold value and the power system lower threshold value represents "power system range", the gap between the solar cell upper threshold value and the solar cell lower threshold value represents "solar cell range", and the gap between the storage battery upper threshold value and the storage battery lower threshold value represents "storage battery range". Therefore, the power system range is narrower than the storage battery range, and the storage battery range is narrower than the solar cell range. Further, the power system range is defined within the storage battery range, and the storage battery range is defined within the solar cell range. The power system range, the solar cell range, and the storage battery range are defined to be larger than zero volt.

When the voltage value of the DC bus 14 becomes larger than the target value and reaches the power system upper threshold value "355 V" or larger, the power converter 30 for a power system performs power control in accordance with the power system control value in which the power system upper stabilization command value is reflected. Therefore, the power converter 30 for a power system operates to approximate the voltage value of the DC bus 14 to the target value than complying with a request. from the electric utility company etc. Meanwhile, the voltage value of the DC bus 14 has not reached the storage battery upper threshold value "360 V" or the solar cell upper threshold value "370 V" so that the power converter 40 for a solar cell and the power converter 50 for a storage battery perform power control in accordance with the control value in which the upper stabilization command value are not reflected and the control command values are reflected. Therefore, the power converter 40 for a solar cell operates to maximize the output power according to MPPT control than approximating the voltage value of the DC bus 14 to the target value. This inhibits the efficiency of power control from dropping. The same discussion as set forth above for the power converter 40 for a solar cell applies to the power converter 50 for a storage battery.

When the voltage value of the DC bus 14 increases further and reaches the storage battery upper threshold value "360 V" or larger, the power converter 50 for a storage battery performs power control in accordance with the storage battery control value in which the storage battery upper stabilization command value is reflected. Therefore, the power converter 50 for a storage battery operates to approximate the voltage value of the DC bus 14 to the target value than complying with a request for charging or discharging, etc. The power converter 30 for a power system continues to operate as it has operated. Meanwhile, the voltage value of the DC bus 14 has not reached the solar cell upper threshold value "370 V" so that the power converter 40 for a solar cell performs power control in accordance with the control value in which the upper stabilization command value is not reflected and the control command value is reflected.

When the voltage value of the DC bus 14 increases further and reaches the solar cell upper threshold value "370 V" or larger, the power converter 40 for a solar cell performs power control in accordance with the solar cell control value in which the solar cell upper stabilization command value is reflected. Therefore, the power converter 40 for a solar cell operates to approximate the voltage value of the DC bus 14 to the target value than maximizing the output power. The power converter 30 for a power system and the power converter 50 for a storage battery continue to operate as they have operated. Thus, the upper threshold value and the lower threshold value differ between the power converter 30 for a power system, the power converter 40 for a solar cell, and the power converter 50 for a storage battery so that power control is performed in a manner that the roles of the power system 10, the solar cell 42, and the storage battery 52 are taken into consideration.

Figure 4:
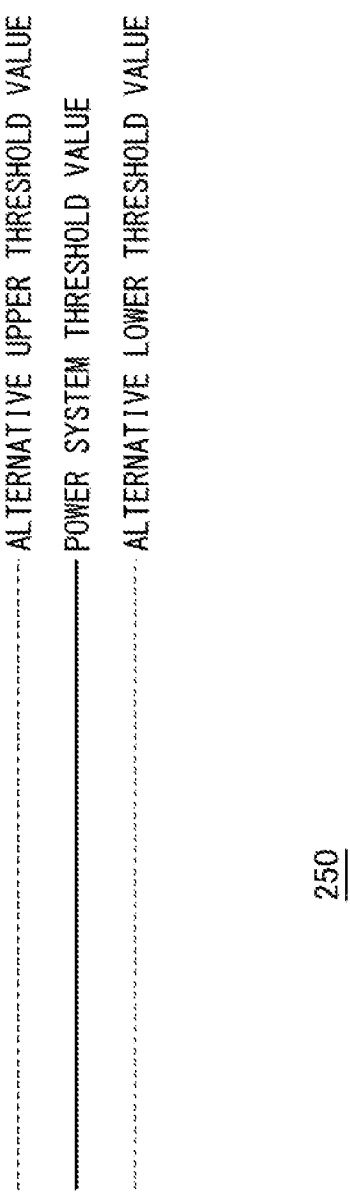
FIG. 4 shows alternative threshold values stored in the stabilization command value derivation unit of FIG. 2.

FIG. 4 shows alternative threshold values stored in the stabilization command value derivation unit 250. The figure shows power system threshold values. The power system threshold value is a threshold value inclusive of the power system upper threshold value and the power system lower threshold value. This is equivalent to defining the power system range as one value. The solar cell upper threshold value, the solar cell lower threshold value, the storage battery upper threshold value, and the storage value lower threshold value may be set as described above.

The device, the system, or the entity that executes the method according to the disclosure is provided with a computer. By causing the computer to run a program, the function of the device, the system, or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via wide area communication network including the Internet.

According to this embodiment, the range that should be compared with the voltage on the DC bus 14 is changed depending on the power converter 200. Therefore, the timing for deriving the control value based on the stabilization command value can be changed depending on the power converter 200. Further, since the timing for deriving the control value based on the stabilization command value can be changed depending on the power converter 200, the power converter 200 operating to stabilize the voltage on the DC bus 14 and the power converter 200 operating for the inherent purpose can coexist. Further, since the power converter 200 operating to stabilize the voltage on the DC bus 14 and the power converter 200 operating for the inherent purpose can coexist, it is possible to inhibit the efficiency of power control from dropping, while at the same time stabilizing the system.

Further, since each power converter 200 has a function of maintaining the DC bus 14 autonomously, the system can operate in a stable manner while, at the same time, maintaining the voltage on the DC bus 14 within a certain range. Further, the shorter the period of time in which the voltage on the DC bus 14 is maintained in a certain range, the longer the period of time in which the equipment is optimally controlled so that the efficiency of power control is inhibited from dropping. Further, differences are provided in the size of the range so that the coordinated operation of the system can be achieved.

Further, since the power system range is defined within the storage battery range or the solar cell range, the power converter 30 for a power system can be operated preferentially for the purpose of stabilizing the DC bus 14. Further, since the power system range is defined within the storage battery range or the solar cell range, the power converter 40 for a solar cell or the power converter 50 for a storage battery can be operated for the inherent purpose. Further, since the power system range is defined as one value, the variation in the voltage on the DC bus 14 can be reduced. Further, since the variation in the voltage on the DC bus 14 is reduced, the system can be stabilized. Further, the power converter 30 for a power system is operated to stabilize the DC bus 14, the system can be stabilized. Further, since the power converter 40 for a solar cell can be operated for the inherent purpose, the efficiency of power control is inhibited from dropping.

A summary of an embodiment of the present disclosure is given below. A power system 100 includes: a first power converter that is connected to a first target of control capable of performing at least one of generation, storage, and distribution of power and also connected to a DC bus 14; and a second power converter that is connected to a second target of control capable of performing at least one of generation, storage, and distribution of power and also connected to the DC bus 14. The first power converter performs power control of the first target of control by using a first control value derived based on a first stabilization command value for causing a voltage on the DC bus 14 to be within a first range and a first control command value different from the first stabilization command value, the second power converter performs power control of the second target of control by using a second control value derived based on a second stabilization command value for causing the voltage on the DC bus 14 to be within a second range and a second control command value different from the second stabilization command value, and the first range is narrower than the second range.

The first range is defined within the second range.

The first range is defined as one value.

The first target of control is the power system 10.

The first target of control is the storage battery 52, and the second target of control is the solar cell 42.

Another embodiment of the present disclosure relates to a power system 100. The power system 100 includes: a first power converter that is connected to a first target of control capable of performing at least one of generation, storage, and distribution of power and also connected to a DC bus 14; and a second power converter that is connected to a second target of control capable of performing at least one of generation, storage, and distribution of power and also connected to the DC bus 14. The first power converter performs power control of the first target of control by using a first control value derived based on a first stabilization command value for causing a voltage on the DC bus 14 to be within a first range and a first control command value different from the first stabilization command value, the second power converter performs power control of the second target of control by using a second control value derived based on a second stabilization command value for causing the voltage on the DC bus 14 to be within a second range and a second control command value different from the second stabilization command value, and a lower limit of the first range and the second range is larger than zero volt.

Still another embodiment of the present disclosure relates to the power converter 200. The power converter 200 is connected to a target of control capable of performing at least one of generation, storage, and distribution of power and also connected to a DC bus 14, the power converter 200 including: a stabilization command value derivation unit 250 that derives a stabilization command value for causing a voltage on the DC bus 14 to be within a preset range; a control command value derivation unit 260 that derives a control command value different from the stabilization command value; a control value derivation unit 270 that derives a control value based on the stabilization command value and the control command value; and an instruction unit 280 that performs power control of the target of control by using the control value.

Embodiment 2

A description will now be given of embodiment 2. Like embodiment 1, embodiment 2 relates to a power system in which a power converter is connected to each of the generator, the storage battery, and the power system at a customer's site, and the plurality of power converters are connected to a DC bus. In particular, embodiment 2 relates to the power converter for a power system. The power system 100 according to embodiment 2 is of the same type as that of FIG. 1, and the power converter 40 for a solar cell and the power converter 50 for a storage battery are of the same as those of FIG. 2. The description below highlights a difference from embodiment 1.

Figure 5:
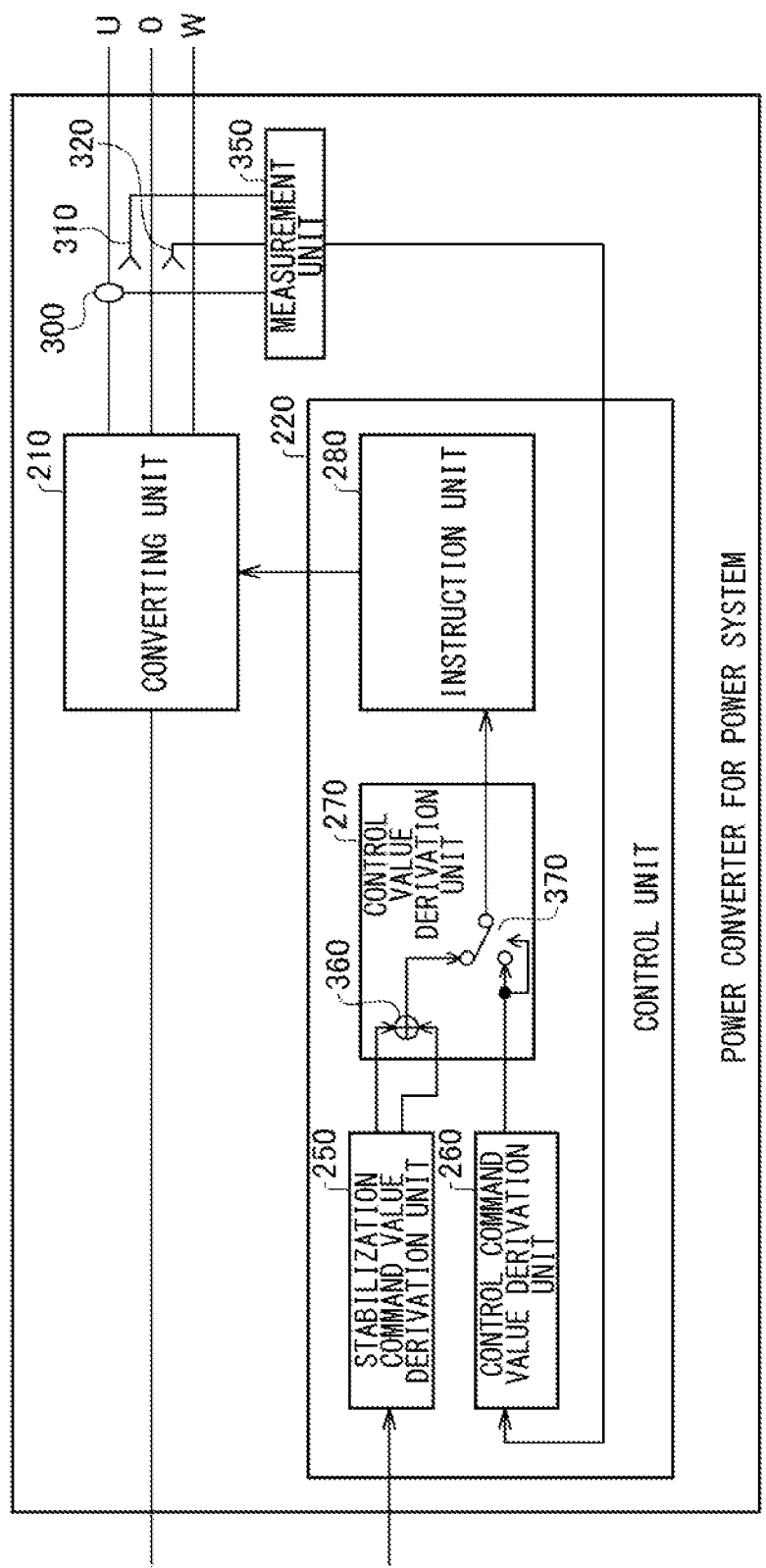
FIG. 5 shows a configuration of the power converter for a power system according to embodiment 2.

FIG. 5 shows a configuration of the power converter 30 for a power system. The power converter 30 for a power system includes a converting unit 210, a control unit 220, an output current detection circuit 300, a U-phase voltage detection circuit 310, a W-phase voltage detection circuit 320, and a measurement unit 350. The control unit 220 includes a stabilization command value derivation unit 250, a control command value derivation unit 260, a control value derivation unit 270, and an instruction unit 280. The control value derivation unit 270 includes a sum calculation unit 360 and a switch 370.

As described above, the converting unit 210 is a bidirectional inverter and is controlled by the control unit 220. The output current detection circuit 300 detects the U-phase output current, the U-phase voltage detection circuit 310 detects the U-phase voltage, and the W-phase voltage detection circuit 320 detects the W-phase voltage. The measurement unit 350 measures the output power value based on the U-phase output current, the U-phase voltage, and the W-phase voltage detected. A publicly known technology may be used, and a description thereof is omitted. The measurement unit 350 outputs the output power value to the control command value derivation unit 260.

The control command value derivation unit 260 receives the output power value from the measurement unit 350. Further, the control command value derivation unit 260 maintains a rated power value (e.g., 5.5 kW) unique to the power converter 30 for a power system. The rated power value is the maximum rating (maximum current/maximum power) tolerated in the power converter 30 for a power system. The control command value derivation unit 260 compares the output power value and the rated power value. When the output power value is equal or larger than the rated power value, the control command value derivation unit 260 outputs the power system control command value that makes the output power value smaller than the rated power value to the control value derivation unit 270. In other words, the control command value derivation unit 260 derives the power system control command value in the case the status in the power converter 30 for a power system reaches a predefined range or beyond.

The control value derivation unit 270 receives at least one of the power system upper stabilization command value and the power system lower stabilization command value from the stabilization command value derivation unit 250, and the power system control command value from the control command value derivation unit 260. The sum calculation unit 360 calculates a sum (hereinafter, "sum command value") of the power system upper stabilization command value and the power system lower stabilization command value. When the power system control command value is not available, the switch 370 outputs the sum command value as the power system control value to the instruction unit 280. When the power system control command value is available, on the other hand, the switch 370 outputs the power system control command value as the power system control value to the instruction unit 280. In other words, the control value derivation unit 270 derives the power system control value by switching between the sum command value and the power system control command value.

Figure 6:
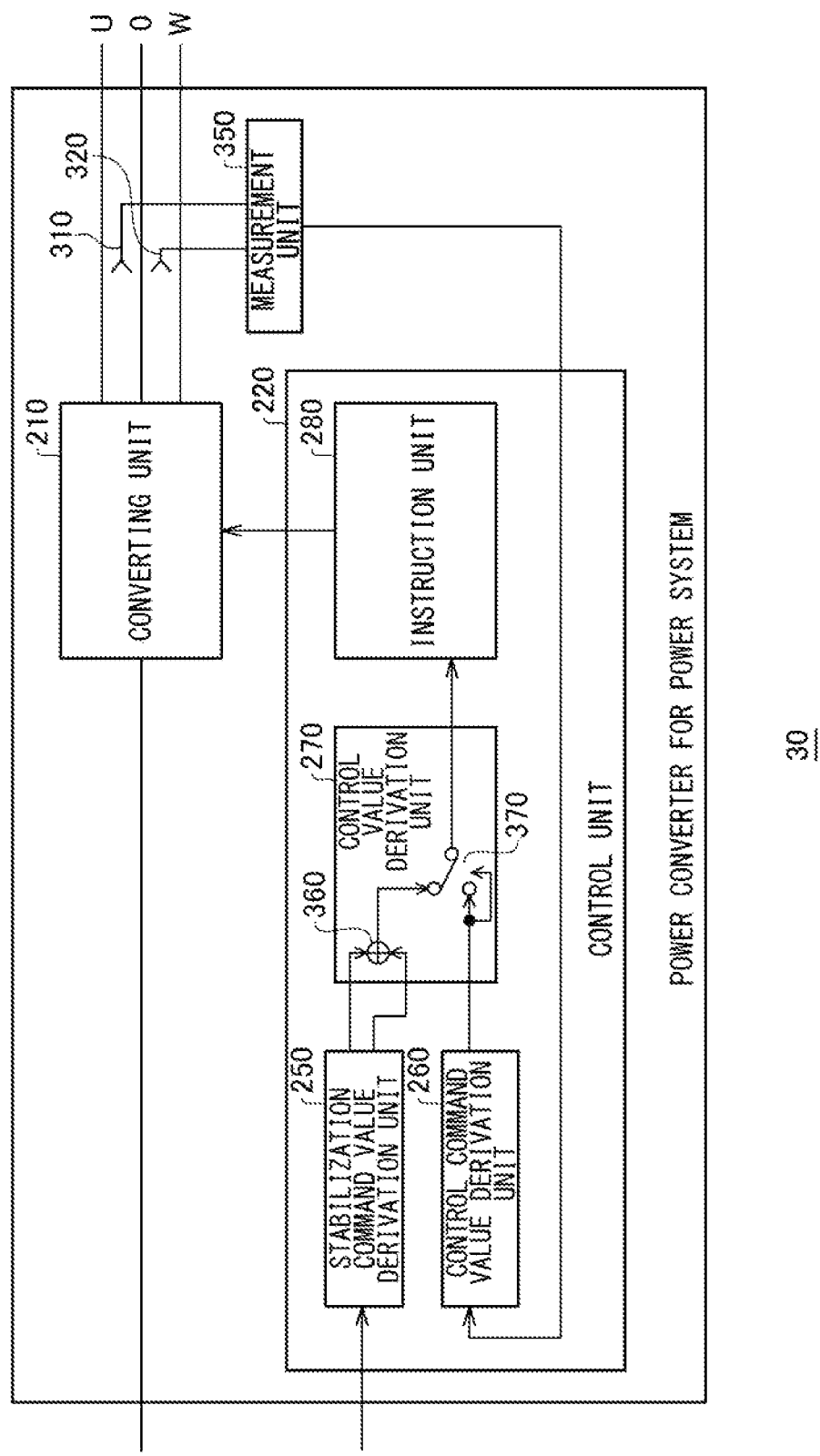
FIG. 6 shows an alternative configuration of the power converter for a power system according to embodiment 2.

FIG. 6 shows an alternative configuration of the power converter 30 for a power system. The power converter 30 for a power system includes the converting unit 210, the control unit 220, the U-phase voltage detection circuit 310, the W-phase voltage detection circuit 320, and the measurement unit 350. The control unit 220 includes the stabilization command value derivation unit 250, the control command value derivation unit 260, the control value derivation unit 270, and the instruction unit 280. The control value derivation unit 270 includes the sum calculation unit 360 and the switch 370.

The U-phase voltage detection circuit 310 detects the U-phase voltage, and the W-phase voltage detection circuit 320 detects the W-phase voltage. The measurement unit 350 measures the U-phase voltage value and the W-phase voltage value (hereinafter, generically referred to as "voltage value"). A publicly known technology may be used, and a description thereof is omitted. The measurement unit 350 outputs the voltage value to the control command value derivation unit 260.

The control command value derivation unit 260 receives the voltage value from the measurement unit 350. Further, the control command value derivation unit 260 maintains a system voltage rise suppression value unique to the power converter 30 for a power system. The control command value derivation unit 260 compares the voltage value with the system voltage rise suppression value. When the voltage value is equal or larger than the system voltage rise suppression value, the control command value derivation unit 260 outputs the power system control command value that makes the voltage value smaller than the system voltage rise suppression value to the control value derivation unit 270. In other words, the control command value derivation unit 260 derives the power system control command value in the case the status in the power converter 30 for a power system reaches a predetermined range or beyond.

Figure 7:
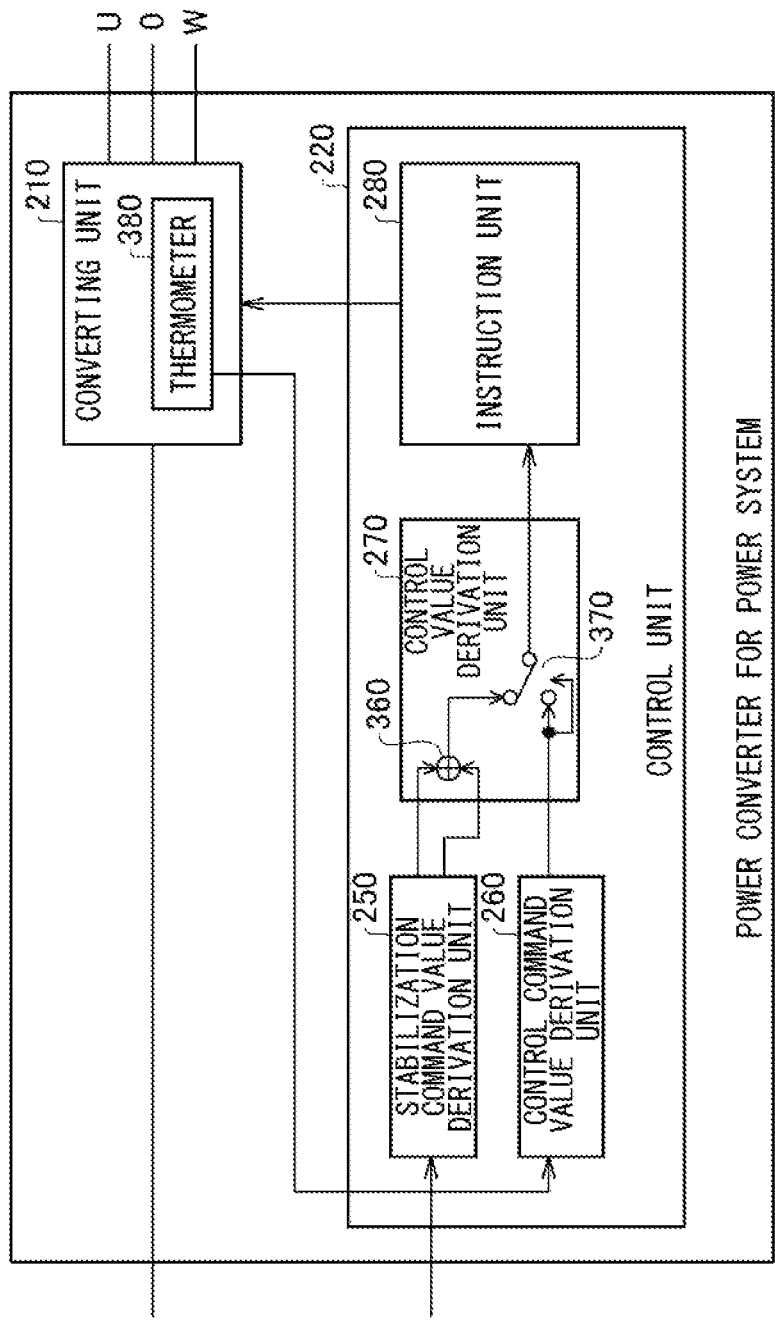
FIG. 7 shows still another configuration of the power converter for a power system according to embodiment 2.

FIG. 7 shows still another configuration of the power converter 30 for a power system. The power converter 30 for a power system includes the converting unit 210 and the control unit 220. The converting unit 210 includes a thermometer 380, and the control unit 220 includes the stabilization command value derivation unit 250, the control command value derivation unit 260, the control value derivation unit 270, and the instruction unit 280. The control value derivation unit 270 includes the sum calculation unit 360 and the switch 370.

The thermometer 380 measures the temperature of the converting unit 210 and, for example, the temperature of the power semiconductor provided in the converting unit 210. The control command value derivation unit 260 receives the temperature from the thermometer 380. Further, the control command value derivation unit 260 maintains a temperature suppression value unique to the power converter 30 for a power system. The control command value derivation unit 260 compares the temperature and the temperature suppression value. When the temperature is equal to or higher than the temperature suppression value, the control command value derivation unit 260 outputs the power system control command value th at makes the temperature lower than the temperature suppression value to the control value derivation unit 270. In other words, the control command value derivation unit 260 derives the power system control command value in the case the status in the power converter 30 for a power system reaches a predetermined range or beyond.

In the cases discussed above, the control command value derivation unit 260 outputs the power system control command value when the status in the power converter 30 for a power system is detected to have a value equal to or larger than a unique value. However, the control command value derivation unit 260 may output the power system control command value when the control command value derivation unit 260 receives a request from the electric utility company, a request from the VPP, or a request from the HEMS equipment, as in embodiment 1. This is equivalent to deriving, when an input from outside the output current detection circuit 300 is received, the power system control command value corresponding to the input. Further, detection of the status in the power converter 30 for a power system having a value equal to or larger than a unique value may be combined with reception of an external input. This is equivalent to a case in which a plurality of types of power system control command values are derivable.

Figure 8:
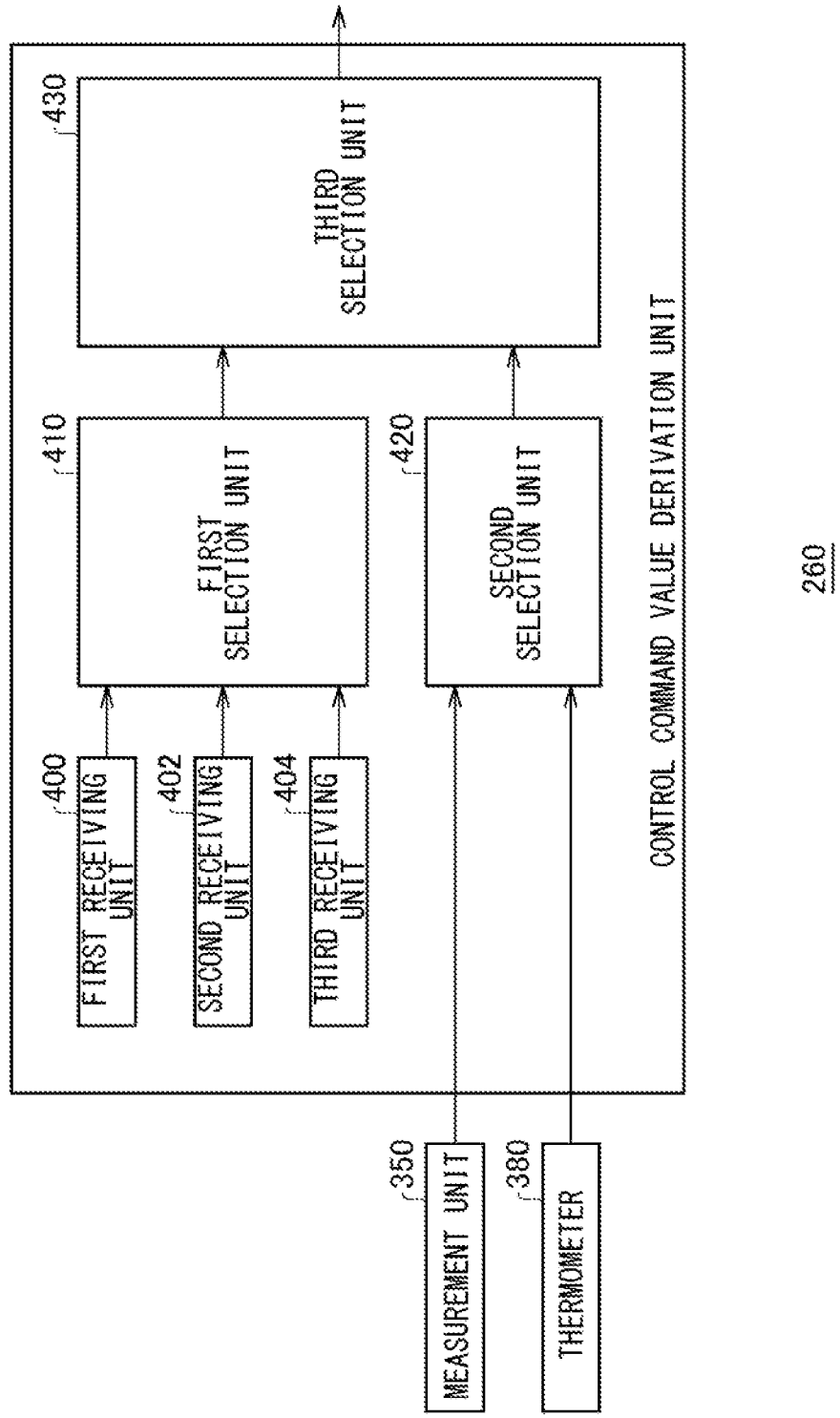
FIG. 8 shows a configuration of the control command value derivation unit according to embodiment 2.

FIG. 8 shows a configuration of the control command value derivation unit 260. The control command value derivation unit 260 includes a first reception unit 400, a second reception unit 402, a third reception unit 404, a first selection unit 410, a second selection unit 420, and a third selection unit 430. Further, the control command value derivation unit 260 is connected to the measurement unit 350 and the thermometer 380.

The first reception unit 400 can receive a request from the electric utility company from outside. The second reception unit 402 can receive a request from the VPP from outside. The third reception unit 404 can receive a request from the HEMS equipment from outside. When at least one of the first reception unit 400 through the third reception unit 404 receives a request, the first selection unit 410 selects a candidate of the control command value (hereinafter, "first candidate") that has the smallest value. That the candidate has the smallest value means that the power input from the DC bus 14 to the converting unit 210 or output from the converting unit 210 to the DC bus 14 when control is performed in accordance with the candidate of the control command value is smallest.

The second selection unit 420 performs the process of the control command value derivation unit 260 in FIGS. 5 through 7. When the status has a value equal to or larger than at least one of the unique values, the second selection unit 420 selects a candidate of the control command value that has the smallest value (hereinafter, "second candidate"). The third selection unit 430 selects one of the first candidate from the first selection unit 410 and the second candidate from the second selection unit 420 that has the smallest value as the control command value. The third selection unit 430 outputs the power system control command value to the control value derivation unit 270.

A description will be given of the operation of the power converter 30 for a power system configured as described above. FIG. 9 is a flowchart showing steps of output from the power converter 30 for a power system. When the power system control command value from the control command value derivation unit 260 is available (Y in S10), the control value derivation unit 270 outputs the power system control command value as the power system control value (S12). When the power system control command value from the control command value derivation unit 260 is not available (N in S10), the control value derivation unit 270 outputs the sum command value as the power system command value (S14).

According to this embodiment, since the power system control command value and the power system stabilization command value are selectively used, the operation suited to the inherent purpose can be performed even when the operation is performed to stabilize the voltage on the DC bus 14. Further, since the power system control command value and the power system stabilization command value are selectively used, output control, voltage rise suppression, reverse flow control, etc. can be performed even when the operation is performed to stabilize the voltage on the DC bus 14. Further, since the power system stabilization command value is used as the power system control value when the power system control command value is not available, the voltage on the DC bus 14 can be stabilized. Further, since the power system control command value is used as the power system control value when the power system control command value is available, the operation suited to the inherent purpose can be performed.

Further, when an input from outside is received, the power system control command value corresponding to the input is derived so that the operation suited to the input from outside can be performed. Further, since the power system control command value is derived when the status in the power converter 30 for a power system reaches a predetermined range or beyond, the operation that makes the status to be within the predetermined range can be performed. Further, when a plurality of types of power system control command values are derivable, the power system control command value that reduces the power input from the DC bus 14 to the converting unit 210 or the power output from the converting unit 210 to the DC bus 14 is selected so that the impact on the system is reduced.

A summary of an embodiment of the present disclosure is given below. The first power converter derives the first control value by switching between the first control command value and the first stabilization command value.

When the first control command value is not available, the first power converter uses the first stabilization command value as the first control value, and, when the first control command value is available, the first power converter uses the first control value as the first control value.

When an input from outside is received, the first power converter derives the first control command value corresponding to the input.

When the status in the first power converter reaches a predetermined range or beyond, the first power converter derives the first control command value.

When a plurality of types of the first control command values are derivable, the first power converter derives the first control command value that reduces power input from the DC bus 14 to the first power converter or power output from the first power converter to the DC bus 14.

Given above is a description of the present disclosure based on exemplary embodiments. The embodiments are intended to be illustrative only and it will be understood by those skilled in the art that various modifications to constituting elements and processes could be developed and that such modifications are also within the scope of the present disclosure.

INDUSTRIAL APPLICABILITY

According to the disclosure, it is possible to inhibit the efficiency of power control from dropping, while at the same time stabilizing the system.

REFERENCE SIGNS LIST 10 power system (first target of control), 12 power distribution line, 14 DC bus, 16 branch node, 30 power converter for a power system (first power converter), 40 power converter for a solar cell (second power converter), 42 solar cell (second target of control), 50 power converter for a storage battery (first power converter, second power converter), 52 storage battery (first target of control, second target of control), 60 measurement apparatus, 100 power system, 200 power converter (first power converter, second power converter), 210 converting unit, 220 control unit, 250 stabilization command value derivation unit, 252 upper derivation unit, 254 lower derivation unit, 260 control command value derivation unit, 270 control value derivation unit, 280 instruction unit

The invention claimed is:

1. A power system comprising:
a first power converter that is connected to a first target of control capable of performing at least one of generation, storage, and distribution of power and also connected to a DC bus; and
a second power converter that is connected to a second target of control capable of performing at least one of generation, storage, and distribution of power and also connected to the DC bus, wherein
the first power converter performs power control of the first target of control by using a first control value derived based on a first stabilization command value for causing a voltage on the DC bus to be within a first range and a first control command value different from the first stabilization command value,
the first range is a difference between a first lower threshold value and a first upper threshold value,
the second power converter performs power control of the second target of control by using a second control value derived based on a second stabilization command value for causing the voltage on the DC bus to be within a second range and a second control command value different from the second stabilization command value,
the second range is a difference between a second lower threshold value and a second upper threshold value,
the first range is narrower than the second range,
the first power converter derives the first control value by switching between the first control command value and the first stabilization command value, and
when the first control command value is not available, the first power converter uses the first stabilization command value as the first control value, and, when the first control command value is available, the first power converter uses the first control command value as the first control value.

2. The power system according to claim 1, wherein the first range is defined within the second range.

3. The power system according to claim 2, wherein the first range is defined as one value.

4. The power system according to claim 1, wherein when an input from outside is received, the first power converter derives the first control command value corresponding to the input.

5. The power system according to claim 1, wherein when the status in the first power converter reaches a predetermined range or beyond, the first power converter derives the first control command value.

6. The power system according to claim 1, wherein when a plurality of types of the first control command values are derivable, the first power converter derives the first control command value that reduces power input from the DC bus to the first power converter or power output from the first power converter to the DC bus.

7. The power system according to claim 1, wherein the first target of control is a power system.

8. The power system according to claim 1, wherein the first target of control is a storage battery apparatus, and the second target of control is a renewable energy generator.

9. A power system comprising:
a first power converter that is connected to a first target of control capable of performing at least one of generation, storage, and distribution of power and also connected to a DC bus; and
a second power converter that is connected to a second target of control capable of performing at least one of generation, storage, and distribution of power and also connected to the DC bus, wherein
the first power converter performs power control of the first target of control by using a first control value derived based on a first stabilization command value for causing a voltage on the DC bus to be within a first range and a first control command value different from the first stabilization command value,
the first range is a difference between a first lower threshold value and a first upper threshold value,
the second power converter performs power control of the second target of control by using a second control value derived based on a second stabilization command value for causing the voltage on the DC bus to be within a second range and a second control command value different from the second stabilization command value,
the second range is a difference between a second lower threshold value and a second upper threshold value,
the first lower threshold value of the first range and the second lower threshold value of the second range are larger than zero volt,
the first power converter derives the first control value by switching between the first control command value and the first stabilization command value, and
when the first control command value is not available, the first power converter uses the first stabilization command value as the first control value, and, when the first control command value is available, the first power converter uses the first control command value as the first control value.

10. A power converter connected to a target of control capable of performing at least one of generation, storage, and distribution of power and also connected to a DC bus, the power converter comprising:
a stabilization command value derivation unit that derives a stabilization command value for causing a voltage on the DC bus to be within a preset range;
a control command value derivation unit that derives a control command value different from the stabilization command value;
a control value derivation unit that derives a control value based on the stabilization command value and the control command value; and an instruction unit that performs power control of the target of control by using the control value, wherein the control value derivation unit derives the control value by switching between the control command value and the stabilization command value, and when the control command value is not available, the control value derivation unit uses the stabilization command value as the control value, and, when the control command value is available, the control value derivation unit uses the control command value as the control value.

* * * * *